(12) United States Patent
Koga (10) Patent No.: US 11,074,915 B2
(45) Date of Patent: Jul. 27, 2021

(54) VOICE INTERACTION DEVICE, CONTROL METHOD FOR VOICE INTERACTION DEVICE, AND NON-TRANSITORY RECORDING MEDIUM STORING PROGRAM

(71) Applicant: TOYOTA JIDOSHA KABUSHIKI KAISHA, Toyota (JP)

(72) Inventor: Ko Koga, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 16/431,858

(22) Filed: Jun. 5, 2019

(65) Prior Publication Data

US 2020/0082818 A1 Mar. 12, 2020

(30) Foreign Application Priority Data

Sep. 6, 2018 (JP) .............................. JP2018-167080

(51) Int. Cl.
 *G10L 15/22* (2006.01)
 *G10L 15/02* (2006.01)
(52) U.S. Cl.
 CPC .............. *G10L 15/22* (2013.01); *G10L 15/02* (2013.01)
(58) Field of Classification Search
 CPC combination set(s) only.
 See application file for complete search history.

(56) References Cited

U.S. PATENT DOCUMENTS

| | | | |
|---|---|---|---|
| 2008/0235017 A1* | 9/2008 | Satomura | G10L 15/22 704/246 |
| 2018/0018373 A1* | 1/2018 | Yazdian | G06Q 10/10 |

FOREIGN PATENT DOCUMENTS

JP 2006-189394 A 7/2006

OTHER PUBLICATIONS

Speech-Based Interaction with In-Vehicle Computers: The Effect of Speech-Based E-Mail on Drivers' Attention to the Roadway (Year: 2001).*

* cited by examiner

*Primary Examiner* — Ibrahim Siddo
(74) *Attorney, Agent, or Firm* — Oliff PLC (57) ABSTRACT

A voice interaction device includes a processor configured to recognize an utterance content from data of voice of a speaker. The processor is configured to perform voice interaction with the speaker by repeating a process of generating data of an utterance sentence based on the utterance content of the speaker and outputting the data of an utterance sentence by voice. The processor is configured to generate the data of the utterance sentence for inquiring about conditions of the speaker and to output the data of the utterance sentence by voice during execution of the voice interaction with the speaker.

8 Claims, 10 Drawing Sheets

| | | |
|---|---|---|
| (1-1) | AGENT: FIRST, SAY YOUR NAMES | |
| (1-2) | CHILD A: I AM HARUYA | |
| (1-3) | AGENT: HARUYA, WHAT DO YOU LIKE? | |
| (1-4) | HARUYA: AIRPLANES! | IDENTIFICATION OF SPEAKER + IDENTIFICATION OF PREFERENCE |
| (1-5) | AGENT: I SEE, AIRPLANES, OK | |
| (1-6) | CHILD B: I AM RIA | |
| (1-7) | AGENT: RIA, WHAT DO YOU LIKE? | |
| (1-8) | RIA: DANGEROUS CREATURES! | |
| (1-9) | AGENT: DANGEROUS CREATURES, OK | |
| (1-10) | AGENT: HARUYA AND RIA, NICE TO MEET YOU | |
| (1-11) | AGENT: LET ME EXPLAIN THE RULES OF THE QUIZ. FIRST, I WILL ASK GIVE A QUESTION, AND ONE WHOEVER KNOWS THE CORRECT ANSWER WILL SAY "YES!" AND GIVE THE ANSWER WHEN I SAY "YES, OO, GO AHEAD."  ONE POINT IS ADDED FOR EACH CORRECT ANSWER.  NO POINT IS ADDED WHEN YOU ANSWER BEFORE I SAY "YES, OO, GO AHEAD" OR IF THE WRONG PERSON ANSWERS. | |
| (1-12) | AGENT: RIGHT.  WHO IS THE DRIVER? | |
| (1-13) | FATHER (DRIVER): IT'S ME | IDENTIFICATION OF SPEAKER |
| (1-14) | AGENT: FATHER, THANK YOU FOR DRIVING! | |

FIG. 4

| | |
|---|---|
| (2-1) | AGENT: OK, LET'S PLAY ANIMAL WORD CHAIN. "KA" OR "HA" WORKS FOR "GA" OR "PA"! |
| (2-2) | RIA: GO-RI-RA! |
| (2-3) | HARUYA: RA-KU-DA! |
| (2-4) | AGENT: "TA" WORKS FOR "DA." TA-SU-MA-NI-A-N-DE-VI-RU! |
| (2-5) | RIA, HARUYA: WHAT'S THAT!! |

FIG. 5

| | |
|---|---|
| (3-1) | AGENT: COME ON, LET'S PLAY THE DANGEROUS CREATURE QUIZ THAT RIA LIKES |
| (3-2) | RIA: YAY! |
| (3-3) | AGENT: WHAT IS THE MOST DANGEROUS CREATURE IN JAPAN? |
| (3-4) | RIA: BEAR! |
| (3-5) | HARUYA: SNAKE! |
| (3-6) | AGENT: WRONG!  THE CORRECT ANSWER IS WASP! |

*FIG. 6*

| | |
|---|---|
| (4-1) | AGENT: OH, SOME TIME (FOR EXAMPLE, 15 MINUTES) HAS PASSED... IS THERE ANYONE WHO WANTS TO USE THE RESTROOM? |
| (4-2) | RIA, HARUYA: ... (SILENT) |
| (4-3) | AGENT: THEN IS THERE ANYONE WHO WANTS TO DRINK TEA? |
| (4-4) | HARUYA: HERE! |
| (4-4) | AGENT: HARUYA, DON'T DRINK TOO MUCH TEA OR YOU'LL HAVE TO GO PEE! |
| (4-5) | HARUYA: OK! |

*FIG. 7*

| | |
|---|---|
| (5-1) | AGENT: SOME TIME (FOR EXAMPLE, 15 MINUTES) HAS PASSED... IS THERE ANYONE WHO WANTS TO USE THE RESTROOM? |
| (5-2) | HARUYA: I HAVE TO PEE... |
| (5-3) | AGENT: FATHER, LET'S STOP AT THE NEXT PA |

| | |
|---|---|
| (6-1) | FATHER (DRIVER): AGENT, PLAY THE DANGEROUS CREATURE QUIZ THE RIA LIKES |
| (6-2) | AGENT: SHALL WE PLAY THE DANGEROUS CREATURE QUIZ THAT RIA LIKES? |
| (6-3) | RIA: YES~ |
| (6-4) | HARUYA: WELL, YES~ |

(7-1) FATHER (DRIVER): AGENT, SLIGHTLY DECREASE THE SOUND VOLUME
(7-2) AGENT: ALL RIGHT, FATHER. IS THIS VOLUME OK?

(8-1) FATHER (DRIVER): AGENT, DO NOT SPEAK AROUND INTERSECTIONS.
(8-2) AGENT: ALL RIGHT, FATHER.  I WILL NOT SPEAK AROUND INTERSECTIONS.

| | |
|---|---|
| (10-1) | FATHER (DRIVER): AGENT, I THINK THEY'RE FIGHTING. |
| (10-2) | AGENT (WITH LARGE VOLUME): IF FATHER HAS DIFFICULTY IN DRIVING BECAUASE OF TWO FIGHTING, WHAT WILL HAPPEN? |
| (10-3) | RIA: AN ACCIDENT! |
| (10-4) | AGENT: YOU DON'T WANT AN ACCIDENT IS TERRIBLE.  LET'S PLAY A FUN WORD CHAIN GAME. |
| (10-5) | RIA, HARUYA: OK, LET'S PLAY ~ |

FIG. 17

| | |
|---|---|
| (11-1) | FATHER (DRIVER): AGENT, I THINK THEY'RE FIGHTING. |
| (11-2) | AGENT (WITH LARGE VOLUME): KIDS, LET ME TELL YOU A SCARY STORY NOW ~ |
| (11-3) | RIA, HARUYA: WHAT?  REALLY?  PLEASE, PLEASE |
| (11-4) | AGENT: IF YOU WANT TO HEAR A SCARY STORY, YOU MUST NOT FIGHT, OK? |
| (11-5) | RIA, HARUYA: OK ~ |

VOICE INTERACTION DEVICE, CONTROL METHOD FOR VOICE INTERACTION DEVICE, AND NON-TRANSITORY RECORDING MEDIUM STORING PROGRAM

INCORPORATION BY REFERENCE

The disclosure of Japanese Patent Application No. 2018-167080 filed on Sep. 6, 2018 including the specification, drawings and abstract is incorporated herein by reference in its entirety.

BACKGROUND

1. Technical Field

The disclosure relates to a voice interaction device, a control method for a voice interaction device, and a non-transitory recording medium having a program stored therein.

2. Description of Related Art

A voice interaction device that is mounted in a vehicle or the like and performs voice interaction with an occupant in the vehicle has been proposed. For example, Japanese Unexamined Patent Application Publication No. 2006-189394 (JP 2006-18394 A) discloses a technique of displaying an agent image reflecting a speaker's preference on a monitor and performing voice interaction with the speaker via the agent image.

SUMMARY

In the technique disclosed in JP 2006-189394 A, a line of sight, an orientation of a face, a voice, and the like of a speaker are detected by image recognition or voice recognition and voice interaction with an agent image is controlled based on the results of detection. However, in such image recognition or voice recognition, it is difficult to accurately understand conditions (for example, physical conditions) of a speaker who performs voice interaction. Accordingly, in the technique disclosed in JP 2006-18394 A, there is a problem in that conditions of a speaker cannot be monitored.

In the disclosure, conditions of a speaker are monitored.

A first aspect of the present disclosure is a voice interaction device. The voice interaction device includes a processor configured to recognize an utterance content from data of voice of a speaker. The processor is configured to perform voice interaction with the speaker by repeating a process of generating data of an utterance sentence based on the utterance content of the speaker and outputting the data of the utterance sentence by voice. The processor is configured to generate the data of the utterance sentence for inquiring about conditions of the speaker and to output the data of the utterance sentence by voice during execution of the voice interaction with the speaker.

With this configuration, the voice interaction device can inquire about conditions of a speaker separately from voice interaction which is being performed with the speaker.

In the voice interaction device, the processor may be configured to acquire the data of the voice and to identify the speaker who has produced the voice. The processor may be configured to generate the data of the utterance sentence which is output by voice as the utterance sentence for inquiring about conditions of the identified speaker.

With this configuration, the voice interaction device can generate an utterance sentence for inquiring about conditions of a speaker who is identified from the data of voice.

In the voice interaction device, the processor may be configured to generate the data of the utterance sentence for inquiring about conditions of the speaker and to output the data of the utterance sentence by voice at intervals of a preset time.

With this configuration, the voice interaction device can inquire about conditions of a speaker at intervals of a predetermined time.

In the voice interaction device, the processor may be mounted in a vehicle and may be configured to generate the data of the utterance sentence for inquiring about conditions of the speaker and to output the data of the utterance sentence by voice when the vehicle arrives at a preset position.

With this configuration, the voice interaction device can inquire about conditions of a speaker based on the position of the vehicle.

In the voice interaction device, the processor may be configured to execute a predetermined control when the speaker is a first speaker who is set as a primary interaction partner. The predetermined control may recognizes the utterance content from the data of voice of the first speaker when the speaker is the first speaker who is set as a primary interaction partner, may performs voice interaction with the first speaker by repeating a process of generating data of the utterance sentence based on the utterance content of the first speaker and outputting the data of the utterance sentence by voice, and may generates the data of the utterance sentence for inquiring about conditions of the first speaker and to output the data of the utterance sentence by voice while performing voice interaction with the first speaker.

With this configuration, the voice interaction device can inquire about conditions of a first speaker while performing voice interaction with the first speaker who is a primary interaction partner.

In the voice interaction device, the processor may be configured to recognize the utterance content from the data of voice of the first speaker. The processor may be configured to generate the data of the utterance sentence associated with conditions of the first speaker based on the utterance content of the first speaker and to output the data of the utterance sentence to a second speaker who is set as a secondary interaction partner among a plurality of speakers by voice.

With this configuration, the voice interaction device can allow the second speaker to recognize conditions of the first speaker early by notifying the second speaker of an answer associated with the conditions of the first speaker.

A second aspect of the present disclosure is a control method for a voice interaction device. The voice interaction device includes a processor. The control method includes: recognizing, by the processor, an utterance content from data of voice of a speaker; performing, by the processor, voice interaction with the speaker by repeating a process of generating data of an utterance sentence based on the utterance content of the speaker and outputting, by the processor, the data of the utterance sentence, by voice; and generating, by the processor, the data of an utterance sentence for inquiring about conditions of the speaker and outputting, by the processor, the data of the utterance sentence by voice while performing voice interaction with the speaker.

With this configuration, in the control method for a voice interaction device, conditions of a speaker can be inquired about separately from voice interaction which is being performed with the speaker.

A third aspect of the present disclosure is a non-transitory recording medium storing a program. The program causes a computer to perform a voice interaction processing step and a voice output step. The voice interaction processing step includes recognizing an utterance content from data of voice of a speaker and performing voice interaction with the speaker by repeating a process of generating data of an utterance sentence based on the utterance content of the speaker and outputting the data of the utterance sentence by voice. The voice output step includes generating data of an utterance sentence for inquiring about conditions of the speaker and outputting the data of the utterance sentence by voice while performing voice interaction with the speaker.

With this configuration, the voice interaction program can inquire about conditions of a speaker separately from voice interaction which is being performed with the speaker.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A voice interaction device, a control method for a voice interaction device, and a voice interaction program according to an embodiment of the disclosure will be described below with reference to the accompanying drawings. The disclosure is not limited to the following embodiment. Elements in the following embodiment include ones which can be easily replaced by those skilled in the art or substantially the same ones.

A voice interaction device according to an embodiment is, for example, a device that is mounted in a vehicle and performs voice interaction with a plurality of speakers (users) in the vehicle. A form of the voice interaction device is, for example, a voice interaction device that is incorporated into a vehicle. In this case, the voice interaction device performs voice interaction with a plurality of speakers via a microphone, a speaker, a monitor, and the like which are provided in the vehicle. Another form of the voice interaction device is a voice interaction device which is constituted by a small robot separated from a vehicle. In this case, the voice interaction device performs voice interaction with a plurality of speakers via a microphone, a speaker, a monitor, and the like which are provided in the robot.

In this embodiment, a personified entity that performs voice interaction with a plurality of speakers as a function of the voice interaction device is defined as "agent." For example, when a voice interaction device is built in a vehicle, an image of a personified agent (image data) is displayed on a monitor or the like. The agent image can be selected according to a speaker's preference from a person, an animal, a robot, an animation character, and the like. When the voice interaction device is constituted by a small robot, the robot itself serves as an agent.

In this embodiment, it is assumed that a family is in a vehicle, and three persons including a "driver (for example, a father)" who sits in the driver's seat, a "fellow passenger (for example, a mother)" who is not a child and sits in the passenger's seat, and a "child" who sits in a rear seat are assumed as speakers who perform voice interaction with the voice interaction device.

it is assumed that the voice interaction device mainly performs voice interaction with the child among the three persons. That is, the voice interaction device reduces a burden on the driver who is driving and provides an environment in which the driver can concentrate on driving by performing voice interaction with the child instead of the driver. Accordingly, interactive content (for example, "a word chain game, a quiz game, singing, a fun story, or a scary story") which is executed by the voice interaction device is mainly for the child. In this embodiment, a primary interaction partner (the child) of the voice interaction device among the plurality of speakers is defined as a "first speaker (first user)" and a secondary interaction partner (the driver or the fellow passenger) of the voice interaction device is defined as a "second speaker (second user)."

Figure 1:
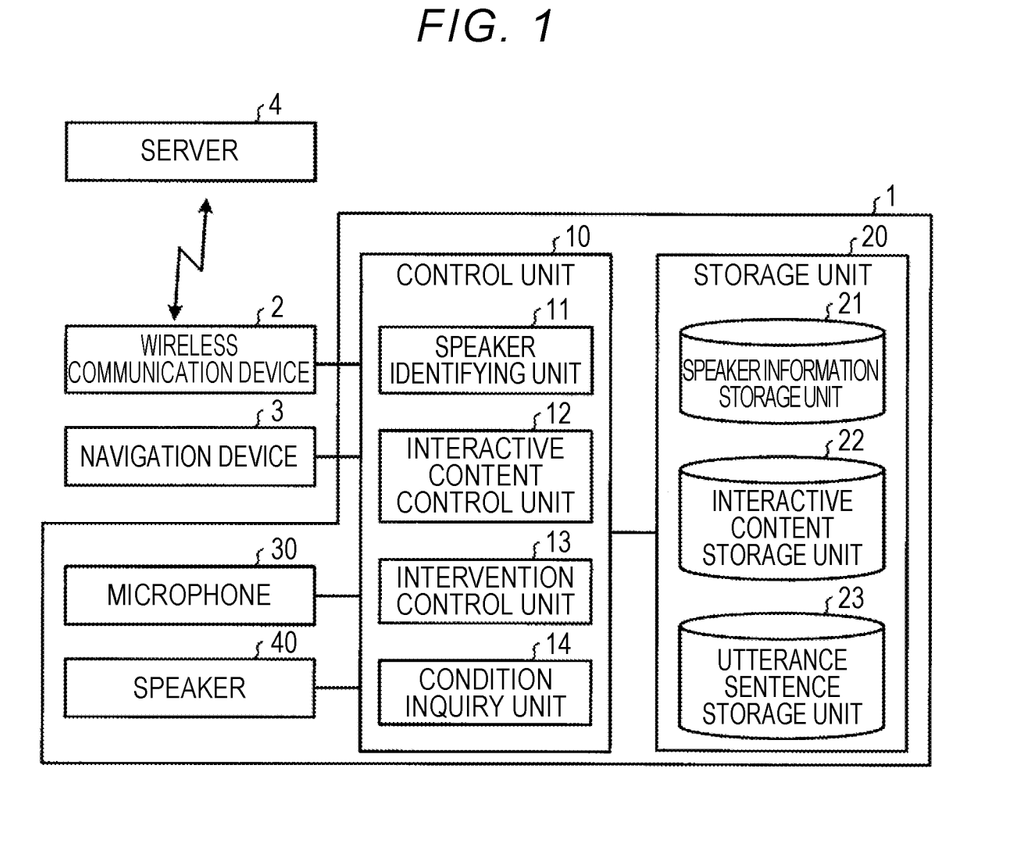
FIG. 1 is a functional block diagram illustrating a voice interaction device according to an embodiment of the disclosure.

As illustrated in FIG. 1, the voice interaction device 1 includes a control unit 10, a storage unit 20, a microphone 30, and a speaker 40. The voice interaction device 1 is connected to a wireless communication device (for example, a data communication module (DCM)) 2 and a navigation device 3 to be able to communicate with them via an onboard network such as a controller area network (CAN).

The wireless communication device 2 is a communication means that communicates with an external server 4. The wireless communication device 2 and the server 4 are connected to each other, for example, via a wireless network. The navigation device 3 includes a display unit such as a monitor and a GPS receiver that receives signals from GPS satellites. The navigation device 3 performs navigation by displaying map information around the vehicle or route information to a destination on the display unit based on information of a current location acquired by the GPS receiver. The server 4 performs a variety of information processing by exchanging information with the vehicle via the wireless communication device 2 if necessary.

The control unit (processor) 10 is specifically constituted by an operation processing device such as a central processing unit (CPU), processes data of voice which is input from the microphone 30, and outputs data of generated utterance sentences to the speaker 40. The control unit 10 functions as a speaker identifying unit 11, an interactive content control unit 12, an intervention control unit 13, and a condition inquiry unit 14 by executing a computer program.

The speaker identifying unit 11 acquires data of voice of a speaker in the vehicle from the microphone 30 and identifies the speaker who has produced the voice, for example, using voiceprint authentication. Specifically, the speaker identifying unit 11 generates data of an utterance sentence (hereinafter simply referred to as an "utterance sentence") for inquiring about a speaker's name in the vehicle or an utterance sentence for inquiring about who a driver and a fellow passenger are and outputs the generated utterance sentence by voice from the speaker 40 (for example, see (1-1) and (1-12) in FIG. 3 which will be described later). A speaker in the vehicle may be only one person (that is, a driver) or may be a plurality of persons (a driver, a fellow passenger, a child, and the like).

Then, the speaker identifying unit 11 acquires data of voice indicating answers from a plurality of speakers from the microphone 30 and recognizes an utterance content thereof. The speaker identifying unit 11 stores information (hereinafter referred to as "speaker data") in which voices, names, and attributes of speakers are correlated in a speaker information storage unit 21 which will be described later. The speaker identifying unit 11 inquires about, for example, preferences and ages of the speakers at the time of identifying a speaker and may add the answer to the speaker data of each speaker.

Here, the "attributes of a speaker" are information indicating which of the first speaker (the child) and the second speaker (the driver or the fellow passenger) each speaker is. Which of the first speaker and the second speaker each speaker is can be understood, for example, by inquiring of a plurality of speakers in the vehicle about who the driver and the fellow passenger (that is, the second speaker) are and acquiring an answer thereof as described above.

Figure 2:
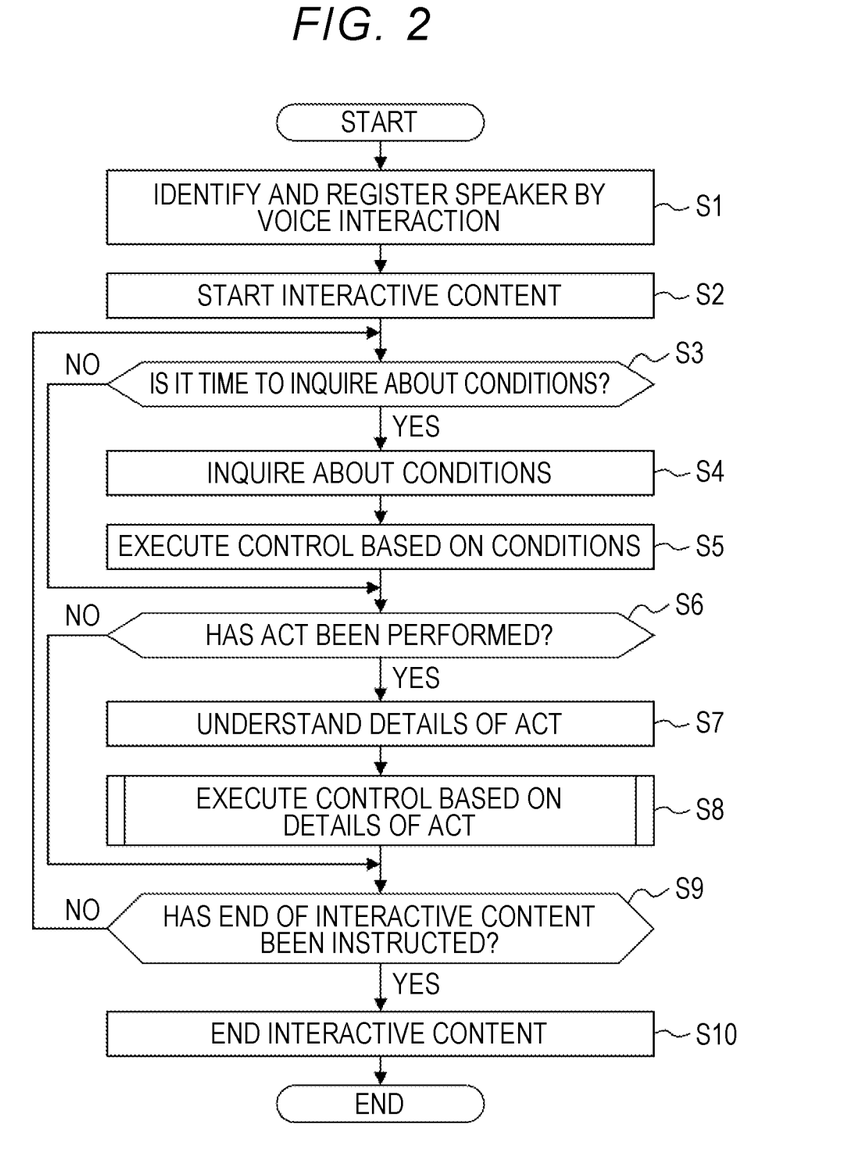
FIG. 2 is a flowchart illustrating a flow of a voice interaction control method which is performed by the voice interaction device according to the embodiment of the disclosure.

Identification of a speaker by the speaker identifying unit 11 is performed before an interactive content is started by the interactive content control unit 12 (see FIG. 2 which will be described later). At least a part (for example, "○○, what do you like?" in (1-3) of FIG. 3 which will be described later) of an utterance sentence which is uttered by an agent at the time of identifying a speaker by the speaker identifying unit 11 is stored in advance in an utterance sentence storage unit 23 which will be described later. The speaker identifying unit 11 reads a part of an utterance sentence which is required for identifying a speaker from the utterance sentence storage unit 23 and combines the read part with, for example, a name of an interaction partner (for example, "Haruya" in FIG. 3) to generate an utterance sentence (for example, (1-3) in FIG. 3). Then, the speaker identifying unit 11 outputs the generated utterance sentence by voice from the speaker 40.

The interactive content control unit 12 performs voice interaction with the first speaker (the child) who is set as a primary interaction partner. Specifically, when the speaker identified by the speaker identifying unit 11 is the first speaker, the interactive content control unit 12 recognizes an utterance content from data of voice of the first speaker acquired by the microphone 30. Then, the interactive content control unit 12 performs voice interaction with the first speaker by repeating a process of generating data of an utterance sentence based on the utterance content of the first speaker and outputting the generated utterance sentence by voice from the speaker 40.

Figure 4:
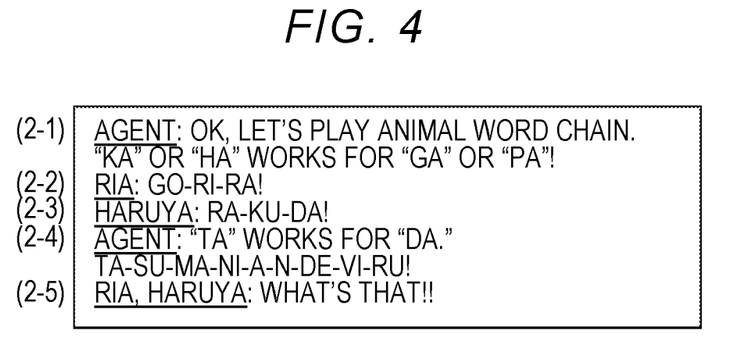
FIG. 4 is a diagram illustrating an example of interactive content in the voice interaction control method which is performed by the voice interaction device according to the embodiment of the disclosure.

In this embodiment, a set of utterance sentences associated with a certain subject (theme), that is, candidates for an utterance sentence (for example, (2-1) in FIG. 4 which will be described later) which is actively uttered to the first speaker and an utterance sentence (for example, (2-4) in FIG. 4) corresponding to an answer of the first speaker, is defined as "interactive content."

The interactive content is set for a plurality of subjects such as "a word chain game, a quiz game, singing, a fun story, and a scary story" and a plurality of types of interactive content for each subject are stored in advance in an interactive content storage unit 22 which will be described later. The interactive content control unit 12 reads interactive content from the interactive content storage unit 22 and selects a necessary utterance sentence or generates an utterance sentence in combination with a name of an interaction partner. The interactive content control unit 12 outputs the selected or generated utterance sentence by voice.

When an act for changing the context of voice interaction with the first speaker is performed by the second speaker, the intervention control unit 13 changes the context of voice interaction which is being performed based on an utterance content of the second speaker. Specifically, the intervention control unit 13 acquires voice of the second speaker who is set as a secondary interaction partner among a plurality of speakers using the microphone 30 while performing voice interaction with the first speaker. Then, the intervention control unit 13 recognizes an utterance content from the data of voice of the second speaker and determines whether the utterance content of the second speaker is for changing the context of voice interaction which is being performed. When it is determined that the utterance content of the second speaker is for changing the context, the intervention control unit 13 generates data of an utterance sentence for changing the context based on the utterance content of the second speaker and outputs the generated utterance sentence by voice from the speaker 40.

In this embodiment, as described above, an act for changing the context of voice interaction with the first speaker, which is performed by the second speaker, is defined as "intervention." In other words, intervention by the second speaker refers to provision of information from the second speaker who understands a situation of the location (in the vehicle). Examples of the case in which intervention by the second speaker is performed while voice interaction is being performed with the first speaker include (1) a case in which interactive content is to be changed to other interactive content, (2) a case in which a sound volume of interactive content is to be changed, (3) a case in which an utterance time of interactive content is to be changed, and (4) a case in which a predetermined act is to be performed on the first speaker. Control which is executed by the intervention control unit 13 (hereinafter referred to as "intervention control") in each case will be described in brief.

When an interactive content is to be changed to another interactive content, the intervention control unit 13 executes first intervention control. When an utterance content of the second speaker acquired during execution of voice interaction with the first speaker is to change the context of the voice interaction which is being performed and the utterance content of the second speaker is a change instruction to change the interactive content (for example, (6-1) in FIG. 9 which will be described later), the intervention control unit 13 changes an interactive content to another interactive content. "Change an interactive content" specifically means that the subject of the voice interaction with the first speaker is changed.

At least a part of an utterance sentence which is uttered by the agent at the time of first intervention control is stored in advance in the utterance sentence storage unit 23 which will be described later. For example, the intervention control unit 13 reads a part of an utterance sentence (for example, "Then, will you play OO which OO likes?" in (6-2) of FIG. 9) which is required for the first intervention control from the utterance sentence storage unit 23 and generates an utterance sentence, for example, by combination with a name of an interaction partner (for example, "Ria" in FIG. 9) or an utterance content of the interaction partner (for example, a "dangerous creature quiz" in FIG. 9) (for example, (6-2) in FIG. 9). Then, the intervention control unit 13 outputs the generated utterance sentence by voice from the speaker 40.

When a sound volume of the interactive content is to be changed, the intervention control unit 13 executes second intervention control. When an utterance content of the second speaker acquired during execution of voice interaction with the first speaker is to change the context of the voice interaction during execution and the utterance content of the second speaker are a change instruction to change a sound volume of the interactive content (for example, (7-1) in FIG. 11 which will be described later), the intervention control unit 13 changes the sound volume of the interactive content. "Change the sound volume of the interactive content" specifically means that a sound volume of a voice output from the speaker 40 is changed, that is, a sound volume of the speaker 40 is changed.

At the time of the second intervention control, at least a part of an utterance sentence which is uttered by the agent is stored in advance in the utterance sentence storage unit 23 which will be described later. The intervention control unit 13 reads a part of an utterance sentence (for example, "All right, OO. Will this sound volume be enough?" in (7-2) in FIG. 11 which will be described later) which is required for the second intervention control from the utterance sentence storage unit 23 and generates an utterance sentence (for example, (7-2) in FIG. 11) by combination with, for example, a name of an interaction partner (for example, "father" in FIG. 11) or the like. Then, the intervention control unit 13 outputs the generated utterance sentence by voice from the speaker 40.

When an utterance time of an interactive content is to be changed, the intervention control unit 13 executes third intervention control. When an utterance content of the second speaker acquired during execution of voice interaction with the first speaker is to change the context of the voice interaction during execution and the utterance content of the second speaker are a change instruction to change an utterance time of the interactive content (for example, (8-1) in FIG. 13 which will be described later), the intervention control unit 13 changes the utterance time of the interactive content. "Change the utterance time of interactive content" specifically means that a time of a voice output from the speaker 40 is changed.

At the time of the third intervention control, at least a part of an utterance sentence which is uttered by the agent is stored in advance in the utterance sentence storage unit 23 which will be described later. The intervention control unit 13 reads a part of an utterance sentence (for example, "All right, OO. I will not speaker around OO." in (8-2) in FIG. 13 which will be described later) which is required for the third intervention control from the utterance sentence storage unit 23 and generates an utterance sentence (for example, (8-2) in FIG. 13) by combination with, for example, a name of an interaction partner (for example, "father" in FIG. 13) or an utterance content of the interaction partner (for example, "intersection" in FIG. 13). Then, the intervention control unit 13 outputs the generated utterance sentence by voice from the speaker 40.

When a predetermined act is to be performed on the first speaker, the intervention control unit 13 performs fourth intervention control. Here, examples of the "case in which a predetermined act is to be performed on the first speaker" include a case in which arbitration in a quarrel is required because children who are the first speakers have a quarrel and a case in which it is necessary to humor a child in a bad temper (a child having a tantrum).

When an utterance content of the second speaker acquired during execution of voice interaction with the first speaker is to change the context of the voice interaction during execution and the utterance content of the second speaker is to perform a predetermined act on the first speaker (for example, (9-1) in FIG. 15 which will be described later), the intervention control unit 13 generates data of an utterance sentence based on details of the act and outputs the data by voice.

At least a part of an utterance sentence which is uttered by the agent at the time of the fourth intervention control is stored in advance in the utterance sentence storage unit 23 which will be described later. For example, the intervention control unit 13 reads a part of an utterance sentence (for example, "OO, why are you crying?" in (9-2) in FIG. 15 which will be described later) which is required at the time of the fourth intervention control from the utterance sentence storage unit 23 and generates an utterance sentence (for example, (9-2) in FIG. 15), for example, by combination with a name of an interaction partner (for example, "Ria" in FIG. 15). Then, the intervention control unit 13 outputs the generated utterance sentence by voice from the speaker 40.

The condition inquiry unit 14 inquires about conditions of a speaker while performing voice interaction with the speaker. For example, when the speaker is the first speaker, the condition inquiry unit 14 generates data of an utterance sentence for inquiring about conditions of the first speaker and outputs the generated utterance sentence to the first speaker by voice from the speaker 40. The "conditions of a speaker" specifically means physical conditions of the speaker and examples thereof include whether the speaker feels thirsty, hungry, a micturition desire, or the like.

The condition inquiry unit 14 generates data of an utterance sentence which is output by voice as an utterance sentence for inquiring about conditions of the speaker (for example, the first speaker) identified by the speaker identifying unit 11. At this time, an utterance sentence for inquiring conditions of each speaker may be generated to include a name of an interaction partner in the utterance sentence or an utterance sentence for inquiring about conditions of all speakers in that place may be generated without including names of interaction partners in the utterance sentence.

At the time of inquiry about conditions, the condition inquiry unit 14 reads at least a part of an utterance sentence (for example, "OO, let's drink tea" in (4-4) in FIG. 6 which will be described later) which is uttered by the agent from the utterance sentence storage unit 23 and generates an utterance sentence (for example, (4-4) in FIG. 6), for example, by combination with a name of an interaction partner (for example, "Haruya" in FIG. 6). Then, condition inquiry unit 14 outputs the generated utterance sentence by voice from the speaker 40.

Here, the condition inquiry unit 14 can inquire about conditions of any one of a child who is the first speaker and a driver or a fellow passenger who is the second speaker, and it is assumed in this embodiment that a child is mainly inquired about conditions.

The condition inquiry unit 14 may inquire about conditions, for example, at intervals of a predetermined time. In this case, the condition inquiry unit 14 generates data of an utterance sentence for inquiring about conditions of the first speaker at intervals of a predetermined time (for example, at intervals of 15 minutes) and outputs the generated utterance sentence to the first speaker by voice from the speaker 40. In this way, by inquiring about conditions of a child (the first speaker) at intervals of a predetermined time, it is possible to reduce a burden on a driver (the second speaker) who is driving and to provide an environment in which the driver can concentrate the driver's mind on driving.

The condition inquiry unit 14 may perform condition inquiry, for example, based on a current location of the vehicle. In this case, for example, when the vehicle arrives at a preset position (for example, the vicinity of an entrance of a highway or the vicinity of an entrance of a parking area (PA)), the condition inquiry unit 14 generates data of an utterance sentence for inquiring about conditions of the first speaker and outputs the generated utterance sentence to the first speaker by voice from the speaker 40. In this way, by inquiring conditions of a child (the first speaker) based on the location of the vehicle, it is possible to reduce a burden on a driver (the second speaker) who is driving and to provide an environment in which the driver can concentrate the driver's mind on driving. The current location of the vehicle can be identified by the navigation device 3.

The condition inquiry unit 14 may notify the second speaker of answer contents from the first speaker at the time of inquiring about conditions. In this case, the condition inquiry unit 14 recognizes the utterance content from data of voice of the first speaker. Then, the condition inquiry unit 14 generates data of an utterance sentence associated with conditions of the first speaker based on the utterance content of the first speaker and outputs the generated utterance sentence to the second speaker by voice from the speaker 40. Accordingly, by notifying a driver (the second speaker) who is driving of an answer associated with conditions of the child (the first speaker), the driver can early recognize conditions of the child.

The storage unit 20 includes, for example, a hard disk drive (HDD), a read only memory (ROM), and a random access memory (RAM) and includes a speaker information storage unit 21, an interactive content storage unit 22, and an utterance sentence storage unit 23.

The speaker information storage unit 21 stores speaker data which is generated by the speaker identifying unit 11. The interactive content storage unit 22 stores a plurality of interactive contents which are used by the interactive content control unit 12 in advance. The interactive content storage unit 22 stores, for example, interactive contents with a plurality of subjects (for example, "a word chain game, a quiz game, singing, a fun story, and a scary story") in which a child who is the first speaker may be interested. The utterance sentence storage unit 23 stores parts of utterance sentences which are generated by the speaker identifying unit 11, the interactive content control unit 12, the intervention control unit 13, and the condition inquiry unit 14 in advance.

The microphone 30 collects voice which is produced from a plurality of speakers (the first speaker: children, the second speaker: a driver and a fellow passenger) and generates data of the voice. Then, the microphone 30 outputs the generated data of the voice to the units of the control unit 10. Data of utterance sentences generated by the units of the control unit 10 is input to the speaker 40. Then, the speaker 40 outputs data of the input utterance sentences to the plurality of speakers (the first speaker: children, the second speaker: a driver and a fellow passenger) by voice.

The microphone 30 and the speaker 40 are provided in a vehicle when the voice interaction device 1 is mounted in the vehicle and is provided in a robot when the voice interaction device 1 is constituted by a small robot.

Hereinafter, a voice interaction control method which is performed by the voice interaction device 1 will be described with reference to FIGS. 2 to 7.

When an agent of the voice interaction device 1 is started (start), the speaker identifying unit 11 identifies and registers a plurality of speakers (a first speaker and a second speaker) in a vehicle by voice interactions (Step S1).

Figure 3:
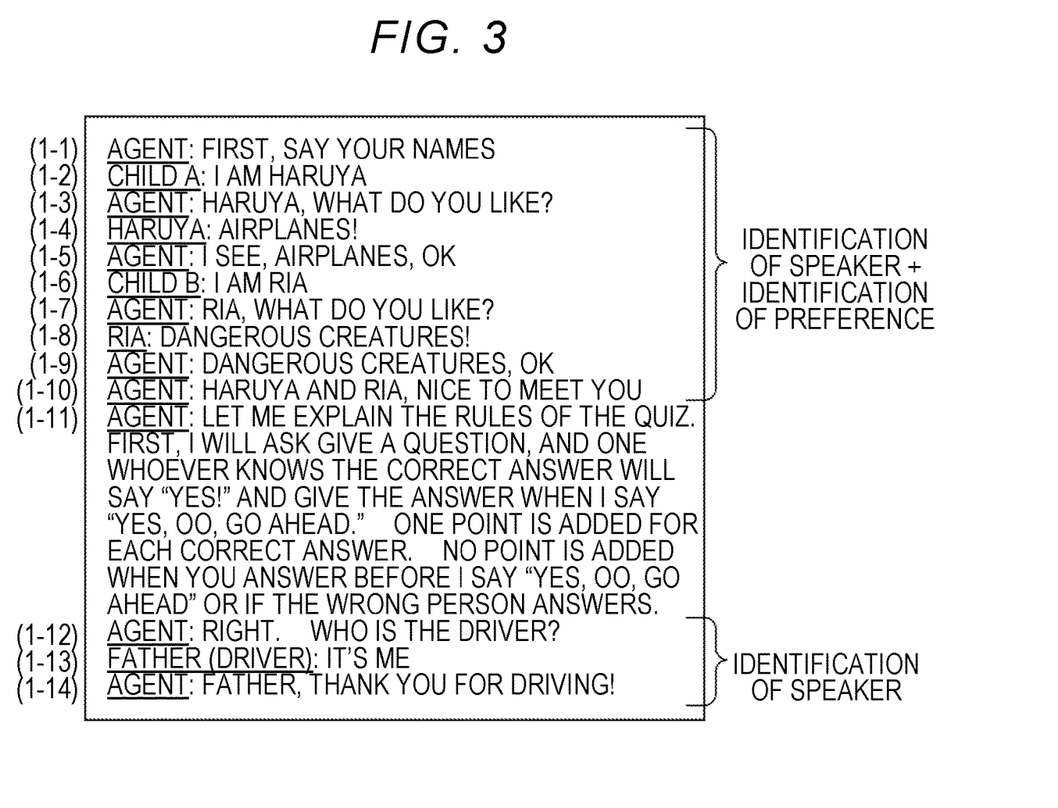
FIG. 3 is a diagram illustrating an example of voice interaction between a speaker and an agent at the time of identifying the speaker in the voice interaction control method which is performed by the voice interaction device according to the embodiment of the disclosure.

In Step S1, names (Haruya and Ria) of two children A and B who are the first speakers are identified by performing voice interaction with the first speakers, for example, as illustrated in (1-1) to (1-9) in FIG. 3 and the names are stored as speaker data in the speaker information storage unit 21. In this step, as illustrated in (1-12) to (1-14) in FIG. 3, a driver (father) who is the second speaker is identified by performing voice interaction with the driver and the identified driver is stored as speaker data in the speaker information storage unit 21.

In Step S1, as illustrated in (1-3) to (1-5) and (1-7) to (1-9) in FIG. 3, preference of the children A and B in addition to the names of the children may be inquired about and may be stored in the speaker information storage unit 21 as the speaker data. The inquired preference is referred to by the interactive content control unit 12 for selecting an interactive content as will be described later (see FIG. 5 which will be described later).

Figure 5:
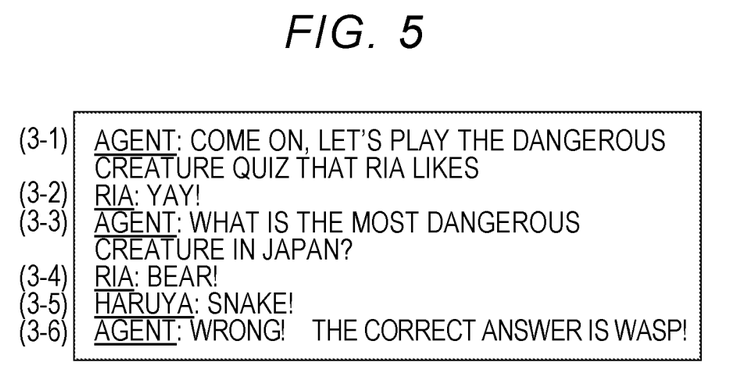
FIG. 5 is a diagram illustrating an example of interactive content based on a first speaker's preference in the voice interaction control method which is performed by the voice interaction device according to the embodiment of the disclosure.

Subsequently, the interactive content control unit 12 starts an interactive content for the children A and B (Step S2). In this step, the interactive content control unit 12 reads an interactive content such as "word chain" illustrated in FIG. 4 or "quiz" illustrated in FIG. 5 from the interactive content storage unit 22 and performs voice interaction. FIG. 5 illustrates an example in which the interactive content control unit 12 selects an interactive content (a dangerous creature quiz) matching the preference of the speaker (child B: Ria) acquired at the time of identification of a speaker from the interactive contents stored in the interactive content storage unit 22.

Subsequently, the condition inquiry unit 14 determines whether it is a time to inquire about conditions (Step S3). For example, when condition inquiry is performed at intervals of a predetermined time, the condition inquiry unit 14 determines that it is a time to inquire about conditions when a predetermined time (for example, 15 minutes) has elapsed from the previous condition inquiry. For example, when condition inquiry is performed based on the current location of the vehicle, the condition inquiry unit 14 determines that it is a time to inquire about conditions when the vehicle arrives at a preset position (for example, an entrance of a highway or an entrance of a parking area (PA)).

When it is determined in Step S3 that it is a time to inquire about conditions (YES in Step S3), the condition inquiry unit 14 inquires about conditions of the first speaker (Step S4) and executes control based on the conditions of the first speaker (Step S5). When it is determined in Step S3 that it is not a time to inquire about conditions (NO in Step S3), the condition inquiry unit 14 performs Step S6.

Figure 6:
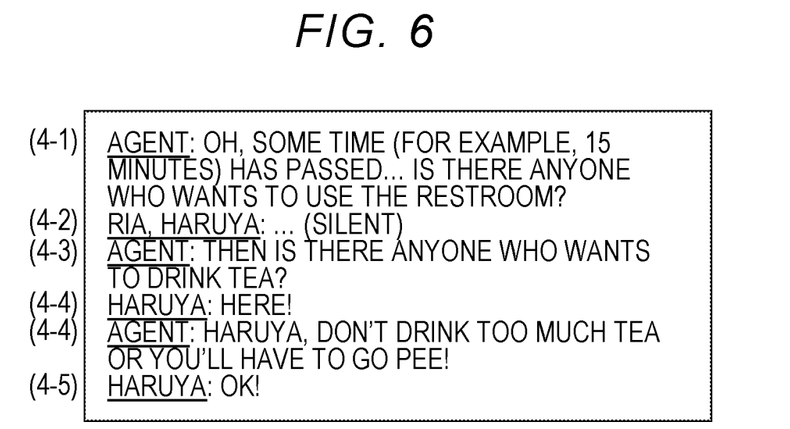
FIG. 6 is a diagram illustrating an example of voice interaction between a speaker and an agent at the time of inquiring about conditions in the voice interaction control method which is performed by the voice interaction device according to the embodiment of the disclosure.

In Step S4, the condition inquiry unit 14 inquires of two children (Haruya and Ria) who are the first speakers about whether each feels a micturition desire and whether each feels thirsty, for example, as illustrated in (4-1) and (4-3) in FIG. 6. In Step S5, the condition inquiry unit 14 produces voice for recommending a drink to Haruya based on an answer ((4-4) in FIG. 6) from Haruya.

Figure 7:
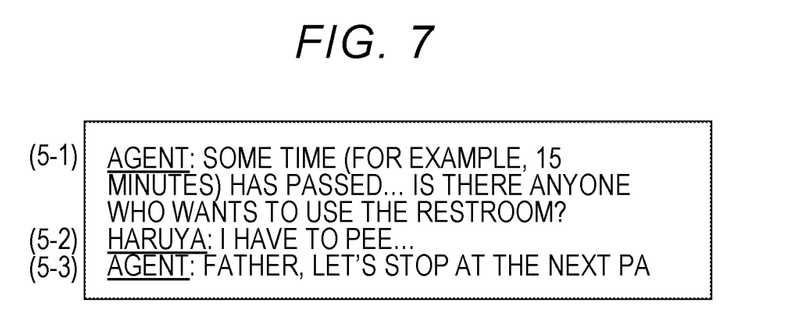
FIG. 7 is a diagram illustrating an example of voice interaction between a speaker and an agent at the time of inquiring about conditions in the voice interaction control method which is performed by the voice interaction device according to the embodiment of the disclosure.

In Step S4, the condition inquiry unit 14 inquires of two children (Haruya and Ria) about whether they feel a micturition desire, for example as illustrated in (5-1) in FIG. 7. Then, in Step S5, the condition inquiry unit 14 produces voice for proposing that the driver (father) takes a rest in a next parking area (PA) based on an answer ((5-2) in FIG. 7) from Haruya.

Subsequently, the intervention control unit 13 determines whether an act for changing the context of voice interaction has been performed by the second speaker during execution of the voice interaction with the first speaker (Step S6). When it is determined in Step S6 that such an act has been performed (YES in Step S6), the intervention control unit 13 ascertains details of the act from the data of voice of the second speaker (Step S7) and executes control based on the details of the act (Step S8). When it is determined in Step S6 that such an act has not been performed (NO in Step S6), the intervention control unit 13 performs Step S9.

Subsequently to Step S8, the interactive content control unit 12 determines whether an instruction to end the interactive content has been given by the second speaker based on the data of voice of the second speaker (Step S9). When it is determined in Step S9 that an instruction to end the interactive content has been given by the second speaker (YES in Step S9), the interactive content control unit 12 ends the interactive content (Step S10). Accordingly, the voice interaction control ends. When it is determined in Step S9 that an instruction to end the interactive content has not been given by the second speaker (NO in Step S9), the interactive content control unit 12 performs Step S3 again.

A specific example of the intervention control of Step S8 in FIG. 2 will be described below with reference to FIGS. 8 to 17. Specific examples of the first to fourth intervention control which are performed by the intervention control unit 13 in Step S8 will be described below.

The first intervention control will be first described. For example, a child who sits on the rear seat may get weary of an interactive content with the same subject when the voice interaction device 1 is performing voice interaction of an interactive content (for example, "word chain") with the child. However, the voice interaction device 1 cannot ascertain such a situation in the place. Therefore, in the first intervention control, the voice interaction device 1 avoids the child's weariness of the interactive content by changing the interactive content through intervention by the driver (or the fellow passenger) who knows such a situation in the place.

Figure 8:
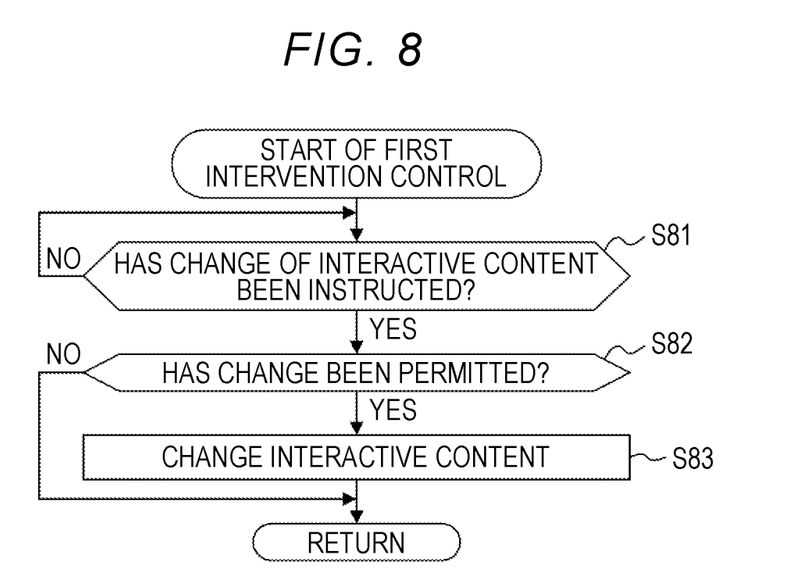
FIG. 8 is a flowchart illustrating a flow of intervention control when intervention details of a second speaker are an instruction to change interactive content in the voice interaction control method which is performed by the voice interaction device according to the embodiment of the disclosure.

In this case, as illustrated in FIG. 8, the intervention control unit 13 determines whether a change instruction to change the interactive content has been given by the second speaker based on the ascertainment result of details of the act in Step S7 (Step S81). When it is determined in Step S81 that a change instruction to change the interactive content has been given by the second speaker (YES in Step S81), the intervention control unit 13 determines whether the first speaker has accepted change of the interactive content based on the utterance content of the first speaker (Step S82). When it is determined in Step S81 that a change instruction to change the interactive content has not been given by the second speaker (NO in Step S81), the intervention control unit 13 performs Step S81 again.

When it is determined in Step S82 that the first speaker has accepted change of the interactive content (YES in Step S82), the intervention control unit 13 changes the interactive content to another interactive content in accordance with the change instruction (Step S83). Accordingly, the first intervention control ends. When it is determined in Step S82 that the first speaker has not accepted change of the interactive content (NO in Step S82), the intervention control unit 13 ends the first intervention control.

Figure 9:
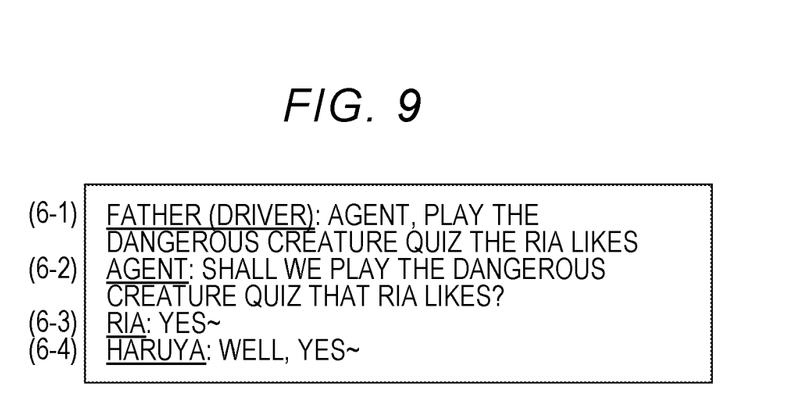
FIG. 9 is a diagram illustrating an example of voice interaction between an agent and speakers when intervention details of a second speaker are an instruction to change interactive content in the voice interaction control method which is performed by the voice interaction device according to the embodiment of the disclosure.

In the first intervention control, for example, voice interaction illustrated in FIG. 9 is performed. First, the driver (father) instructs the agent to change the interactive content to another interactive content (a dangerous creature quiz) which the child (Ria) likes ((6-1) in FIG. 9). Accordingly, the agent requests two children (Ria and Haruya) to accept change of the interactive content ((6-2) in FIG. 9), and changes the interactive content when the two children (Ria and Haruya) accept the change ((6-3) and (6-4) in FIG. 9). In FIG. 9, an example in which two children accept change of the interactive content is illustrated, but when they do not accept the change, the agent may propose change to another interactive content.

Second intervention control will be described below. For example, when the voice interaction device 1 performs voice interaction with the first speaker and a sound volume of the interactive content (the sound volume of the speaker 40) is excessively large, the driver cannot concentrate the driver's mind on driving and there is a likelihood that driving will become unstable. However, the voice interaction device 1 cannot understand a situation in the place. Therefore, in the second intervention control, destabilization of the driver's driving is prevented by accepting intervention of the driver (or the fellow passenger) who understands such a situation in the place and changing the sound volume of the interactive content.

Figure 10:
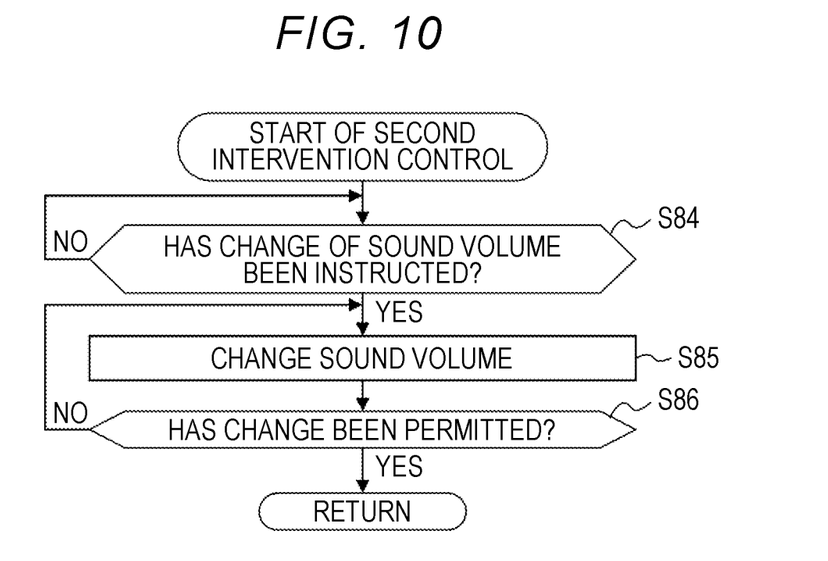
FIG. 10 is a flowchart illustrating a flow of intervention control when intervention details of a second speaker are an instruction to change a sound volume of interactive content in the voice interaction control method which is performed by the voice interaction device according to the embodiment of the disclosure.

In this case, as illustrated in FIG. 10, the intervention control unit 13 determines whether a change instruction to change a sound volume of the interactive content has been given by the second speaker based on the ascertainment result of details of the act in Step S7 (Step S84). When it is determined in Step S84 that the change instruction to change a sound volume of the interactive content has been given by the second speaker (YES in Step S84), the intervention control unit 13 changes the sound volume of the speaker 40 in accordance with the change instruction (Step S85). When it is determined in Step S84 that the change instruction to change a sound volume of the interactive content has not been given by the second speaker (NO in Step S84), the intervention control unit 13 performs Step S84 again.

Subsequently, the intervention control unit 13 determines whether the second speaker has accepted change of the sound volume of the interactive content (Step S86). When it is determined in Step S86 that the second speaker has accepted change of the sound volume of the interactive content (YES in Step S86), the intervention control unit 13 ends the second intervention control. When it is determined in Step S86 that the second speaker has not accepted change of the sound volume of the interactive content (NO in Step S86), the intervention control unit 13 performs again Step S85 again.

Figure 11:
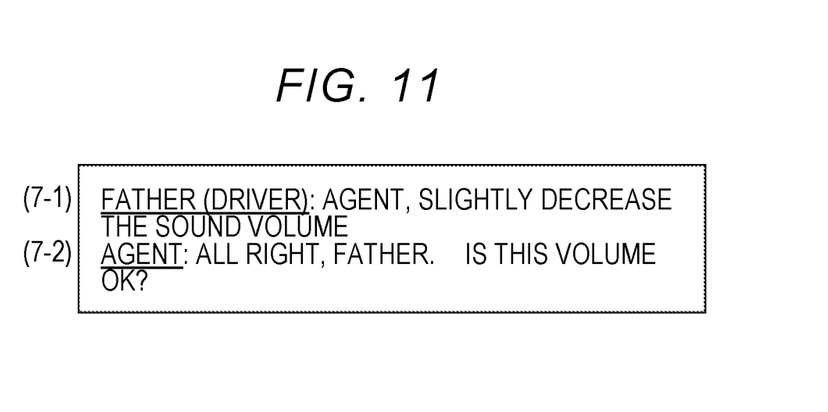
FIG. 11 is a diagram illustrating an example of voice interaction between an agent and a second speaker when intervention details of a second speaker are an instruction to change a sound volume of interactive content in the voice interaction control method which is performed by the voice interaction device according to the embodiment of the disclosure.

In the second intervention control, for example, voice interaction illustrated in FIG. 11 is performed. First, the driver (father) instructs the agent to decrease the sound volume of the interactive content ((7-1) in FIG. 11). Accordingly, the agent decreases the sound volume of the interactive content by a predetermined amount and requests the driver to accept the resultant ((7-2) in FIG. 11).

Third intervention control will be described below. For example, when voice of the voice interaction device 1 for performing voice interaction with the first speaker is heard by the driver in a place in which careful driving is required such as an intersection or an entrance/exit of a highway, the driver cannot concentrate the driver's mind on driving and there is a likelihood that driving will become unstable. However, the voice interaction device 1 cannot understand a situation in the place. Therefore, in the third intervention control, destabilization of the driver's driving is prevented by accepting intervention of the driver (or the fellow passenger) who understands such a situation in the place and changing an utterance time of the interactive content.

Figure 12:
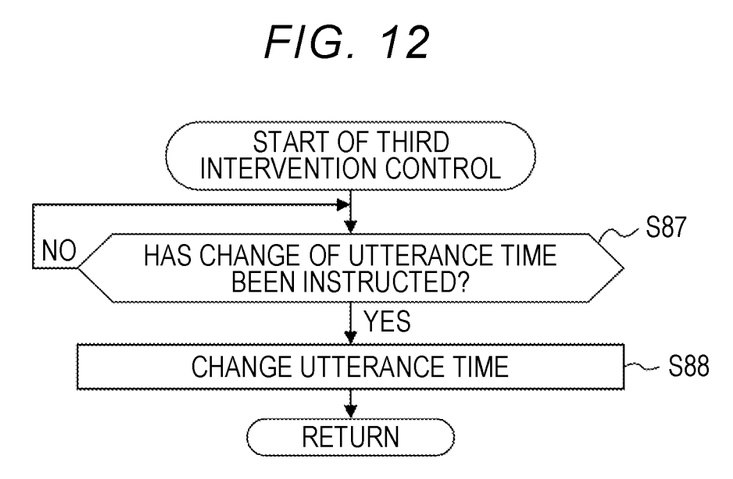
FIG. 12 is a flowchart illustrating a flow of intervention control when intervention details of a second speaker are an instruction to change an utterance time of interactive content in the voice interaction control method which is performed by the voice interaction device according to the embodiment of the disclosure.

In this case, as illustrated in FIG. 12, the intervention control unit 13 determines whether a change instruction to change an utterance time of the interactive content has been given by the second speaker based on the ascertainment result of details of the act in Step S7 (Step S87). When it is determined in Step S87 that the change instruction to change an utterance time of the interactive content has been given by the second speaker (YES in Step S87), the intervention control unit 13 changes the utterance time of the interactive content (Step S88) and ends the third intervention control. When it is determined in Step S87 that the change instruction to change an utterance time of the interactive content has not been given by the second speaker (NO in Step S87), the intervention control unit 13 performs Step S87 again.

Figure 13:
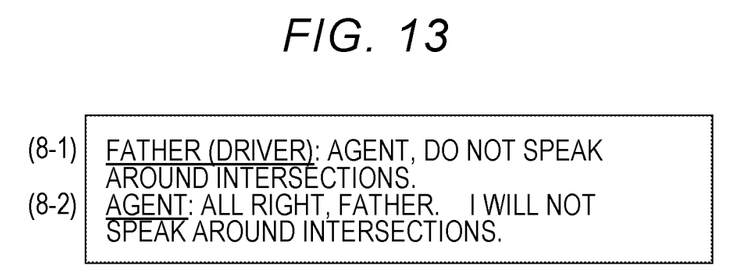
FIG. 13 is a diagram illustrating an example of voice interaction between an agent and a second speaker when intervention details of a second speaker are an instruction to change an utterance time of interactive content in the voice interaction control method which is performed by the voice interaction device according to the embodiment of the disclosure.

In the third intervention control, for example, voice interaction illustrated in FIG. 13 is performed. First, the driver (father) instructs the agent not to utter voice in the vicinity of an intersection ((8-1) in FIG. 13). Accordingly, the agent changes the utterance time such that voice is not produced in the vicinity of an intersection ((8-2) in FIG. 13). A position of an intersection can be identified by the navigation device 3.

Fourth intervention control will be described below. For example, when the children start a quarrel during driving, the driver cannot concentrate the driver's mind on driving and there is a likelihood that driving will become unstable. However, the voice interaction device 1 cannot understand a situation in the place. Therefore, in the fourth intervention control, destabilization of the driver's driving is prevented by accepting intervention of the driver (or the fellow passenger) who understands such a situation in the place and performing arbitration in the quarrel between the children.

Figure 14:
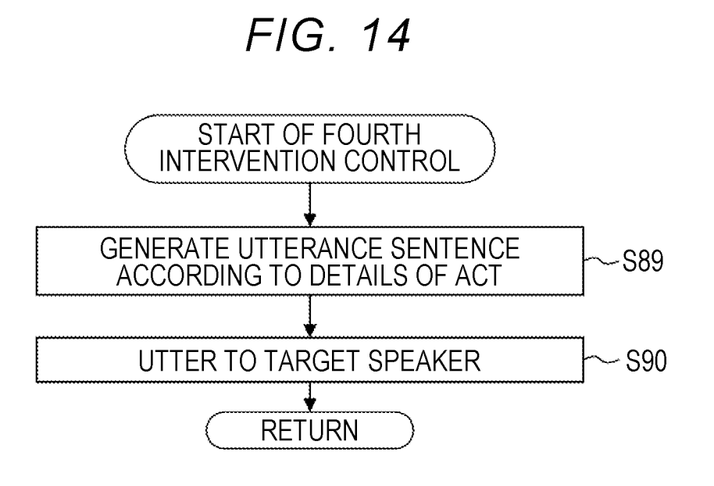
FIG. 14 is a flowchart illustrating a flow of intervention control when intervention details of a second speaker are arbitration in a quarrel in the voice interaction control method which is performed by the voice interaction device according to the embodiment of the disclosure.

In this case, as illustrated in FIG. 14, the intervention control unit 13 generates an utterance sentence corresponding to details of an act of the second speaker based on the ascertainment result of details of the act in Step S7 (Step S89). Then, the intervention control unit 13 utters the utterance sentence (outputs by voice) to the first speaker who is a target (Step S90).

Figure 15:
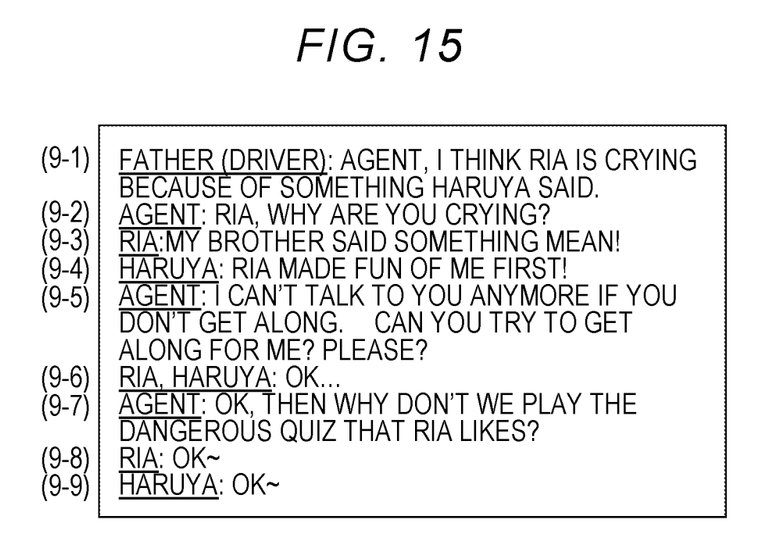
FIG. 15 is a diagram illustrating an example of voice interaction between an agent and speakers when intervention details of a second speaker are arbitration in a quarrel in the voice interaction control method which is performed by the voice interaction device according to the embodiment of the disclosure.

In the fourth intervention control, for example, voice interaction illustrated in FIG. 15 is performed. First, the driver (father) informs the agent of occurrence of a quarrel between the children ((9-1) in FIG. 15). Accordingly, the agent stops the interactive content and performs arbitration in the quarrel between the two children (Ria and Haruya) ((9-2) to (9-6) in FIG. 15). Then, the agent proposes change to another interactive content (a dangerous creature quiz) matching the child (Ria)'s preference ((9-2) to (9-7) in FIG. 15).

Figure 16:
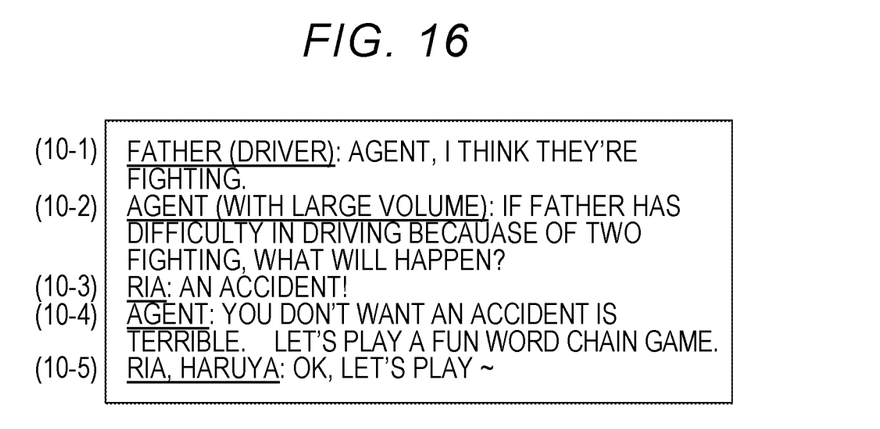
FIG. 16 is a diagram illustrating an example of voice interaction between an agent and speakers when intervention details of a second speaker are arbitration in a quarrel in the voice interaction control method which is performed by the voice interaction device according to the embodiment of the disclosure.

In the fourth intervention control, for example, voice interaction illustrated in FIG. 16 may be performed. First, the driver (father) informs the agent of occurrence of a quarrel between the children ((10-1) in FIG. 16). Accordingly, the agent stops the interactive content and performs arbitration in the quarrel by uttering voice to the two children (Ria and Haruya) with a sound volume larger than normal ((10-2) to (10-4) in FIG. 16). Then, the agent proposes change to another interactive content (a word chain game) ((10-4) and (10-5) in FIG. 16).

Figure 17:
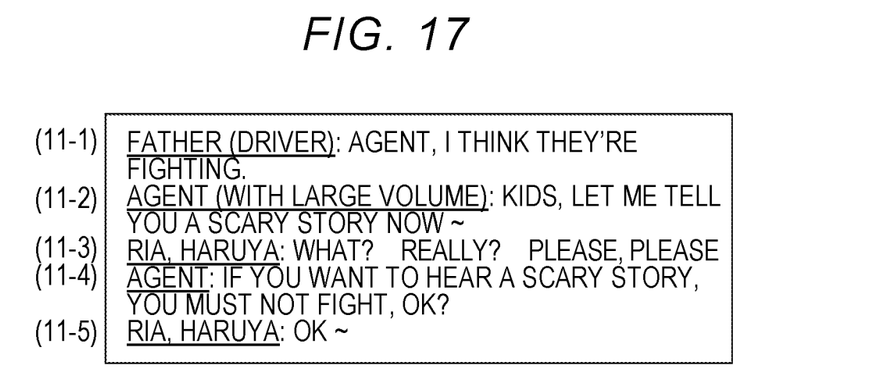
FIG. 17 is a diagram illustrating an example of voice interaction between an agent and speakers when intervention details of a second speaker are arbitration in a quarrel in the voice interaction control method which is performed by the voice interaction device according to the embodiment of the disclosure.

In the fourth intervention control, for example, voice interaction illustrated in FIG. 17 may be performed. First, the driver (father) informs the agent of occurrence of a quarrel between the children ((11-1) in FIG. 17). Accordingly, the agent stops the interactive content and proposes change to another interactive content (a scary story) for the two children (Ria and Haruya) with a sound volume larger than normal ((11-2) in FIG. 17). Accordingly, the two children's interest can transfer from the quarrel to a scary story and the quarrel can be resolved.

In the fourth intervention control, the intervention control unit 13 may recognize a tone of the second speaker from data of voice of the second speaker (the driver or the fellow passenger) and output data of a generated utterance sentence by voice according to the recognized tone. Examples of the "tone" include sound volume, accent, and speed of voice. In this case, for example, when the driver (father) informs the agent of occurrence of a quarrel between the children in a scolding tone or loud sound in FIGS. 15 to 17, the intervention control unit 13 causes the agent to output an utterance sentence by voice in a child scolding tone or loud sound.

In this way, by changing a tone in which an utterance sentence is output by voice according to the tone of the second speaker, the intention of the utterance details produced by the second speaker can be more easily transferred to the first speaker. Accordingly, for example, the driver's intention can be easily reflected when the agent arbitrates in a quarrel between the children or humoring a child in a bad temper. Accordingly, it is possible to perform a more effective act to the child and, for example, to resolve the quarrel between the children earlier or to recover the temper of the children earlier.

As described above, with the voice interaction device 1 according to this embodiment and the voice interaction method using the voice interaction device 1, it is possible to monitor conditions of a speaker by inquiring about conditions of the speaker separately from voice interaction which is being performed between speakers.

With the voice interaction device 1 and the voice interaction method using the voice interaction device 1, when a situation which cannot be easily understood by sensing such as a quarrel between children together in the vehicle or being bad-tempered of a child occurs, it is possible to arbitrate in a quarrel between the children or to humor the children by receiving intervention from the driver (or the fellow passenger). Accordingly, it is possible to prevent a driver from not concentrating the driver's mind on driving and to prevent destabilization of the driver's driving.

A voice interaction program according to this embodiment causes a computer to function as the units (the means) of the control unit 10. The voice interaction program may be stored and distributed in a computer-readable recording medium such as a hard disk, a flexible disk, or a CD-ROM or may be distributed via a network.

While the voice interaction device, the voice interaction method, and the voice interaction program according to this embodiment have been specifically described above with reference to an embodiment of the disclosure, the gist of the disclosure is not limited thereto and should be construed widely based on description of the claims. Various changes, modifications, and the like based on such description are included in the gist of the disclosure.

For example, FIG. 1 illustrates an example in which all the elements of the voice interaction device 1 are mounted in a vehicle, but a part of the voice interaction device 1 may be provided in a server 4. For example, the elements other than the microphone 30 and the speaker 40 in the voice interaction device 1 may be provided in the server 4 and speaker identification, interactive content control, intervention control, and the like may be performed by communicating with the server 4 via the wireless communication device 2.

In FIG. 3, only a driver is identified as the second speaker, but a fellow passenger in addition to the driver may be identified as the second speaker.

In FIGS. 9, 11, 13, and 15 to 17, the entity of the first to fourth intervention control is the driver, but a fellow passenger instead of the driver may be the entity of the first to fourth intervention control.

In FIG. 7, first, conditions of a child (the first speaker) is inquired about ((5-1) in FIG. 7), an answer is received from the child ((5-2) in FIG. 7), and it is proposed that the driver (the second speaker) has a rest in a next parking area ((5-3) in FIG. 7), but conditions of a child may be inquired about on the assumption that the vehicle approaches a parking area, for example, based on the current location of the vehicle acquired by the navigation device 3.

The speaker identifying unit 11 of the voice interaction device 1 may identify a child (the first speaker) and an adult (the second speaker) by inquiring about ages of the speakers at the time of speaker identification.

The above-mentioned embodiment is based on the premise that the voice interaction device 1 is mounted in a vehicle but, for example, the voice interaction device 1 may be provided in a home and may perform voice interaction with the family in the home.

What is claimed is:

1. A voice interaction device comprising:
   a processor configured to:
     recognize an utterance content from data of voice of a speaker,
     perform voice interaction with the speaker by repeating a process of generating data of an utterance sentence based on the utterance content of the speaker and outputting the data of the utterance sentence by voice;
     determine whether it is a time to inquire about the conditions of the speaker;
     determine that it is the time to inquire about the conditions of the speaker when: (i) a predetermined time has elapsed from a previous inquiry about the conditions of the speaker; or (ii) when the processor arrives at a preset position;
   when a determination is made that it is the time to inquire about the conditions of the speaker, generate the data of the utterance sentence for inquiring about the conditions of the speaker; and
   output the data of the utterance sentence by voice during execution of the voice interaction with the speaker.

2. The voice interaction device according to claim 1, wherein
   the processor is configured to:
     acquire the data of the voice and to identify the speaker who has produced the voice; and
     generate the data of the utterance sentence which is output by voice as the utterance sentence for inquiring about the conditions of the identified speaker.

3. The voice interaction device according to claim 1, wherein
the processor is configured to:
generate the data of the utterance sentence for inquiring about the conditions of the speaker and to output the data of the utterance sentence by voice at intervals of a preset time.

4. The voice interaction device according to claim 1, wherein
the processor is mounted in a vehicle and is configured to generate the data of the utterance sentence for inquiring about the conditions of the speaker and to output the data of the utterance sentence by voice when the vehicle arrives at a preset position.

5. The voice interaction device according to claim 1, wherein
the processor is configured to execute a predetermined control when the speaker is a first speaker who is set as a primary interaction partner, and
the predetermined control recognizes the utterance content from the data of voice of the first speaker, performs voice interaction with the first speaker by repeating a process of generating data of the utterance sentence based on the utterance content of the first speaker and outputting the data of the utterance sentence by voice, and generates the data of the utterance sentence for inquiring about the conditions of the first speaker and to output the data of the utterance sentence by voice while performing voice interaction with the first speaker.

6. The voice interaction device according to claim 5, wherein
the processor is configured to:
recognize the utterance content from the data of voice of the first speaker; and
generate the data of the utterance sentence associated with conditions of the first speaker based on the utterance content of the first speaker and to output the data of the utterance sentence to a second speaker who is set as a secondary interaction partner among a plurality of speakers by voice.

7. A control method for a voice interaction device, the voice interaction device including a processor, and the control method comprising:
recognizing, by the processor, an utterance content from data of voice of a speaker;
performing, by the processor, voice interaction with the speaker by repeating a process of generating data of an utterance sentence based on the utterance content of the speaker and outputting, by the processor, the data of the utterance sentence by voice;
determining whether it is a time to inquire about conditions of the speaker;
determining that it is the time to inquire about the conditions of the speaker when: (i) a predetermined time has elapsed from a previous inquiry about the conditions of the speaker; or (ii) when the processor arrives at a preset position;
when a determination is made that it is the time to inquire about the conditions of the speaker, generating, by the processor, the data of the utterance sentence for inquiring about the conditions of the speaker; and
outputting, by the processor, the data of the utterance sentence by voice while performing voice interaction with the speaker.

8. A non-transitory recording medium storing a program, the program causing a computer to perform a process, the process comprising:
recognizing an utterance content from data of voice of a speaker;
performing voice interaction with the speaker by repeating a process of generating data of an utterance sentence based on the utterance content of the speaker and outputting the data of the utterance sentence by voice;
determining whether it is a time to inquire about conditions of the speaker;
determining that it is the time to inquire about the conditions of the speaker when: (i) a predetermined time has elapsed from a previous inquiry about the conditions of the speaker; or (ii) when the processor arrives at a preset position;
when a determination is made that it is the time to inquire about the conditions of the speaker, generating data of the utterance sentence for inquiring about the conditions of the speaker; and
outputting the data of the utterance sentence by voice while performing voice interaction with the speaker.

* * * * *